United States Patent
Weiss (10) Patent No.: US 7,637,427 B2
(45) Date of Patent: Dec. 29, 2009

(54) SHARED FINANCIAL SERVICE SYSTEMS AND METHODS

(75) Inventor: Juergen Weiss, Bad Schönborn (DE)

(73) Assignee: SAP AG, Walldorf (DE)

( * ) Notice: Subject to any disclaimer, the term of this patent is extended or adjusted under 35 U.S.C. 154(b) by 108 days.

(21) Appl. No.: 11/643,885

(22) Filed: Dec. 22, 2006

(65) Prior Publication Data

US 2008/0154753 A1    Jun. 26, 2008

(51) Int. Cl.
- G06K 15/00 (2006.01)
- G06Q 40/00 (2006.01)
- G07D 11/00 (2006.01)
- G07F 19/00 (2006.01)
- G06F 17/30 (2006.01)

(52) U.S. Cl. .................. 235/383; 235/379; 705/10; 705/11; 705/30; 705/37

(58) Field of Classification Search ........... 235/379, 235/380, 383; 705/16, 30–43, 10, 11
See application file for complete search history.

(56) References Cited

U.S. PATENT DOCUMENTS

| | | | | |
|---|---|---|---|---|
| 5,717,989 A | * | 2/1998 | Tozzoli et al. | 705/37 |
| 5,826,241 A | * | 10/1998 | Stein et al. | 705/26 |
| 7,454,376 B1 | * | 11/2008 | Argenbright | 705/36 R |
| 2004/0088245 A1 | * | 5/2004 | Narayan et al. | 705/38 |
| 2005/0283437 A1 | * | 12/2005 | McRae et al. | 705/40 |
| 2006/0095374 A1 | * | 5/2006 | Lo et al. | 705/42 |

* cited by examiner

Primary Examiner—Thien M. Le
Assistant Examiner—Tuyen K Vo
(74) Attorney, Agent, or Firm—Finnegan, Henderson, Farabow, Garrett & Dunner, LLP (57) ABSTRACT

A computer system is configured to execute software, where the software may include a communication application capable of sending a communication from at least one party to a financial or accounting transaction. The software may also include an accounting control application capable of modifying the communication before sending it to another party by utilizing the communication application. The accounting control application may also be capable of tracking the status of the transaction. A method includes sharing financial services where a first party initiates a financial or accounting transaction and sends information related to that transaction through a communication channel to an accounting control module. The accounting control module modifies the information and tracks the status of the transaction. It then sends the modified information to a second party through the communication channel.

25 Claims, 7 Drawing Sheets

SHARED FINANCIAL SERVICE SYSTEMS AND METHODS

BACKGROUND

I. Field of the Invention

The present invention generally relates to systems and methods for financial processing and accounting. More particularly, and without limitation, the present invention relates to systems and methods for processing financial transactions in an automated and traceable manner.

II. Background Information

Enterprise resource planning ("ERP") systems and other enterprise technologies have transformed customer and supply chain processes, but that finance's performance has hardly changed. While some companies have profoundly improved the performance of their financial processes through ERP systems, financial functions are still neglected in many businesses. For example, finance department costs can consume more than 1% of revenues in many companies, and chief financial officers struggle with poor transparency of their daily cash flows.

In times of economic uncertainty and soaring shareholder expectations, every business function is under closer scrutiny, including finance functions. The primary objective for a better finance department is still the same: manage cash and tie up as little working capital as possible. The key performance indicator in this context is the cash flow cycle, which encompasses the time period from when a supplier delivers materials until the receivables department collects cash or payment from customers. The longer the cash flow cycle is, the higher the working capital needs to be. Every reduction made within the cash flow cycle will immediately free up liquid assets.

One approach to reducing the cash flow cycle is to consider finance itself as a supply chain—a multifaceted, end-to-end flow of transactions, cash, value, and information that touches customers, suppliers, banks, and internal functions and relationships. Unlike the physical supply chain, the financial supply chain deals with the flow of cash instead of goods. Indeed, the financial supply chain runs through a company's business like a thread, tying together every function and process. Just like in the physical supply chain, every day that is lost in the cash-to-cash cycle equals lost revenue.

The benefits of a financial supply chain go far beyond cutting costs. Days in payables, for example, can be reduced by decreasing payment terms. On the other hand, companies want to avoid putting their relationships with key suppliers at risk, so they must strategically differentiate how they deal with their individual suppliers. An efficient financial supply chain will drive forward every aspect of the business, give management the tools it needs for continuous improvement, and provide more visibility into a company's financial supply chain network to deal with ever-growing compliance requirements.

One of the key difficulties in optimizing a financial supply chain is that the parties involved (e.g., intra-corporate organizations, corporate subsidiaries, external suppliers, and external customers) often have different expectations for how financial services should be rendered. Differences in computing environments can also pose difficulties in the communication and tracking of financial information and transactions. For example, Company A might expect to receive an invoice in one digital format, but Company B may always uses a different digital format for invoices. Consequently, a person at Company A typically must intervene to process the invoice from Company B, but this intervention might not be necessary if the invoice had been presented in Company B's format in the first place.

Minimizing the differences between the players in the financial supply chain would help alleviate this problem and would offer several benefits. For example, it would reduce the amount of manual intervention necessary in the process, thereby reducing the order-to-cash cycle. It would also facilitate inter-company reconciliation, speeding the period-end close process. The result is a more automated, straight-through processing environment that would improve the transparency of the financial process, allowing it to be more accurately analyzed for process improvements.

One approach to minimizing differences between the players in the financial supply chain is to require them all to standardize their information technology. Given the wide array of financial systems in the marketplace and the massive number of entities with which some companies conduct financial transactions, this approach is unworkable and cost prohibitive. Another approach is to centralize all of the information technology related to financial transactions between the players in the financial supply chain. Again, this approach has proven unworkable and cost prohibitive. An ideal solution would allow each player in the financial supply chain to maintain their own computing environment, while at the same time allowing standardized communications with other players in the financial supply chain.

SUMMARY OF THE INVENTION

A system consistent with the present invention includes a computer system configured to execute software. The software may include a communication application capable of sending a communication from at least one party to a financial or accounting transaction. It may also include an accounting control application capable of modifying the communication before sending it to another party by utilizing the communication application. The accounting control application may also be capable of tracking the status of the transaction.

A method consistent with the present invention includes sharing financial services where a first party initiates a financial or accounting transaction and sends information related to that transaction through a communication channel to an accounting control module. The accounting control module modifies the information and tracks the status of the transaction. It then sends the modified information to a second party through the communication channel.

The foregoing background and summary are not intended to be comprehensive, but instead serve to help artisans of ordinary skill understand the following implementations consistent with the invention set forth in the appended claims. In addition, the foregoing background and summary are not intended to provide any limitations on the claimed invention.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with the invention.

Figure 1:
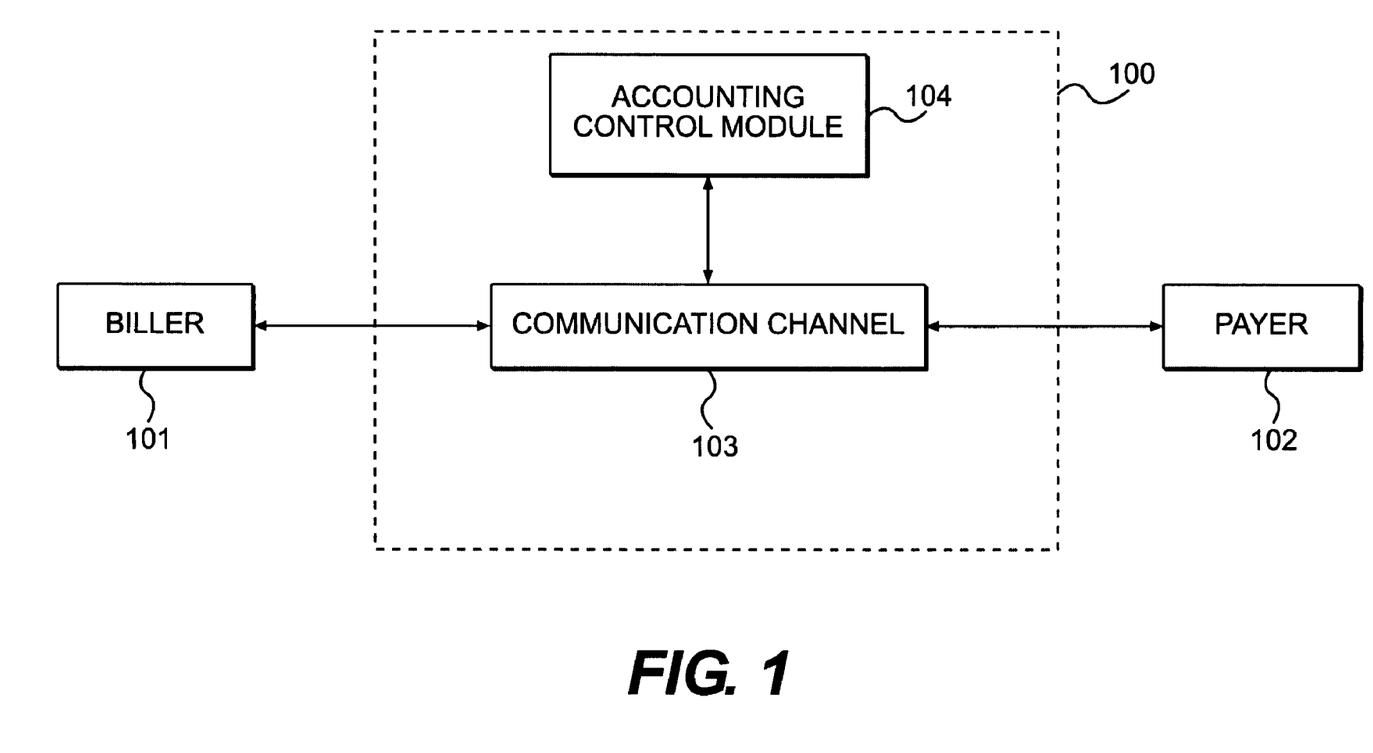
FIG. 1 is a block diagram of an exemplary shared financial service system consistent with an embodiment of the present invention.

In FIG. 1 and the other figures, the lines with arrows indicate the direction that information could potentially flow. In some examples, unidirectional arrows are used to show that, in a given transaction, information typically only flows in one direction. They are not intended to imply that information is only capable of flowing in one direction. Indeed, the communication with respect to each of the disclosed players and modules may be bidirectional.

FIG. 1 is a block diagram of an exemplary system, consistent with an embodiment of the present invention. Area 100 represents a shared financial service system, and may include various hardware modules, software modules, or a combination of the two that may interact or participate in a financial transaction. The potential parties to the transactions are shown outside of shared financial service system area 100.

Biller 101 and Payer 102 are two parties to a financial transaction (e.g., the sending of an invoice and the payment of that invoice). The names "Biller" and "Payer" are used here only as examples, and are not intended to imply that a biller and payer must always be involved in the financial transaction between the parties. Biller 101 and Payer 102, for example, may be departments within one corporation, subsidiaries of a single corporation, or two separate corporations. Biller 101 and Payer 102 are not required to run the same billing, accounts receivable, and accounts payable systems. Instead, they may run different systems, such as applications from SAP AG (Waldorf, Germany), Oracle (Redwood Shores, Calif.), or other vendors.

For purposes of the example of FIG. 1, assume that Biller 101 and Payer 102 are subsidiaries of the same corporation. Biller 101 and Payer 102 communicate through communication channel 103. Communication channel 103 may include any combination of hardware, software, and/or firmware for facilitating communication between Biller 101 and Payer 102. For example, communication channel 103 my use any commercially available means for electronically exchanging information, including a data exchange architecture of an enterprise resource planning package, such as the SAP Exchange Infrastructure available from SAP AG (Waldorf, Germany). In addition, communication channel 103 may be implemented using a suitable network or hardware infrastructure for communicating information, such as the HTTPS, SOAP, or FTP communication protocols.

Accounting control module 104 interfaces with communication channel 103 to receive or intercept communications between Biller 101 and Payer 102. The accounting control module 104 is shown as a separate component in FIG. 1, but those skilled in the art will appreciate that it could also be integrated into the communication channel 103.

According to embodiments consistent with the present invention, accounting control module 104 may provide one or more functions that can be implemented using hardware, software, firmware and/or any combination thereof. For example, one function is to modify the information passed between Biller 101 and Payer 102. As previously mentioned, Biller 101 and Payer 102 may run different software packages, and may require conversion of data from a format usable by Biller 101 into a format usable by Payer 102, and vice versa. Using predefined conversion rules, accounting control module 104 may format the communication in a manner that can readily be used by the recipient's computer system (e.g., a computer system of Biller 101 or Payer 102), thereby reducing the need for manual intervention. Accounting control module 104 may be configured with conversion rules upon its initial setup, and conversion rules may be added or modified after the initial setup as computing systems and file format change.

Accounting control module 104 may also convert the data into a format for viewing by the recipient, such as the Portable Document Format (PDF), XML, or HTML. Consequently, accounting control module 104 has a reporting capability, and accounting control module 104 may be configured with various reporting rules. For example, accounting control module 104 may receive data from Biller 101 related to a transaction. That data may arrive in a relatively raw format, such as providing it in a sequence that accounting control module 104 has been configured to understand, but without providing any other identifying information with it. For example, accounting control module 104 may be configured to understand that the first data value it receives is an order number, the second value it receives indicates a transaction type (e.g., purchase order, invoice, etc.), and the third value it receives indicates a price. While accounting control module 104 may understand how to interpret that data based on the configuration information stored within it, a human user, especially those unfamiliar with the data exchange format, may not be able to readily discern the meaning of the data. In that instance, accounting control module 104 may receive that raw data, interpret it using the configuration information it has stored within it, and generate a report, such as in the PDF format, that is readily understandable by a human recipient. In this example, accounting control module 104 may send to the recipient two types of information for a given transaction, the first being the data itself formatted so that the recipient's computer system can process it without manual intervention, and the second being the PDF report that a human can read and understand.

Consistent with an embodiment, accounting control module 104 may add status information to the communication, so that the current status of the financial transaction is apparent to the recipient. The status information may be added automatically based on the communications exchanged in communication channel 103, or may be added directly by users. In one example where the status information is added automatically, accounting control module 104 may add to the communication that an invoice has been sent but that receipt of the invoice has not yet been acknowledged by the recipient. In an example where the status information is added by a user, the user may access accounting control module 104 via communication channel 103 and update a transaction to reflect that the transaction has been preliminarily approved but is awaiting final approval.

In addition to potentially adding transaction status information to a communication, accounting control module 104 may also store status information and provide reporting capabilities to users (e.g., Biller 101 and Payer 102) based on pre-configured reporting rules. Similar to the manner that communications themselves may be reported, status reports may be provided in any combination of formats that are readily usable by a recipient's computer system without manual intervention (e.g., a data sequence) or can be readily understood by a human (e.g., in a PDF report with headings).

Consistent with an embodiment, accounting control module 104 may also store, check, and enforce predetermined business rules by or between Biller 101 and Payer 102. For example, one business rule might be that no new invoices may be sent less than two days before a period-end close. In that case, accounting control module 104 would parse the communication to determine the type of financial transaction and, if the rule was violated, would return a notification to the sender of the message that the rule had been violated. Depending on how the business rule is structured in the accounting control module 104, the communication would be allowed to pass on to the recipient, perhaps with additional information added to note that it was sent in violation of a business rule, or it could be returned to the sender who must then wait until the proper time to resend the communication. Those skilled in the art will appreciate that a myriad of business rules can be contained in the accounting control module 104, and that the example described above is merely illustrative of the types of rules that can be contained in it. Further, business rules can be programmed at the time the accounting control module is initially configured, or they can be added by users in a self-service manner. These customizations to the rules as well as other customizations, such as changes to the interface of the accounting control module 104, may be stored in accounting control module 104.

Accounting control module 104 may also orchestrate the coordination, interaction, and operation of various modules in the shared financial service system. As will be demonstrated in the examples below, various other modules may assist in a transaction, and accounting control module 104 can coordinate the timing and form of the participation of those modules.

Therefore, accounting control module 104 in FIG. 1 may provide capabilities such as converting data, updating communication status information, tracking transaction status information, reporting transaction and status information, applying and enforcing business rules, and coordinating the interaction of other modules in a shared financial service system.

Figure 2:
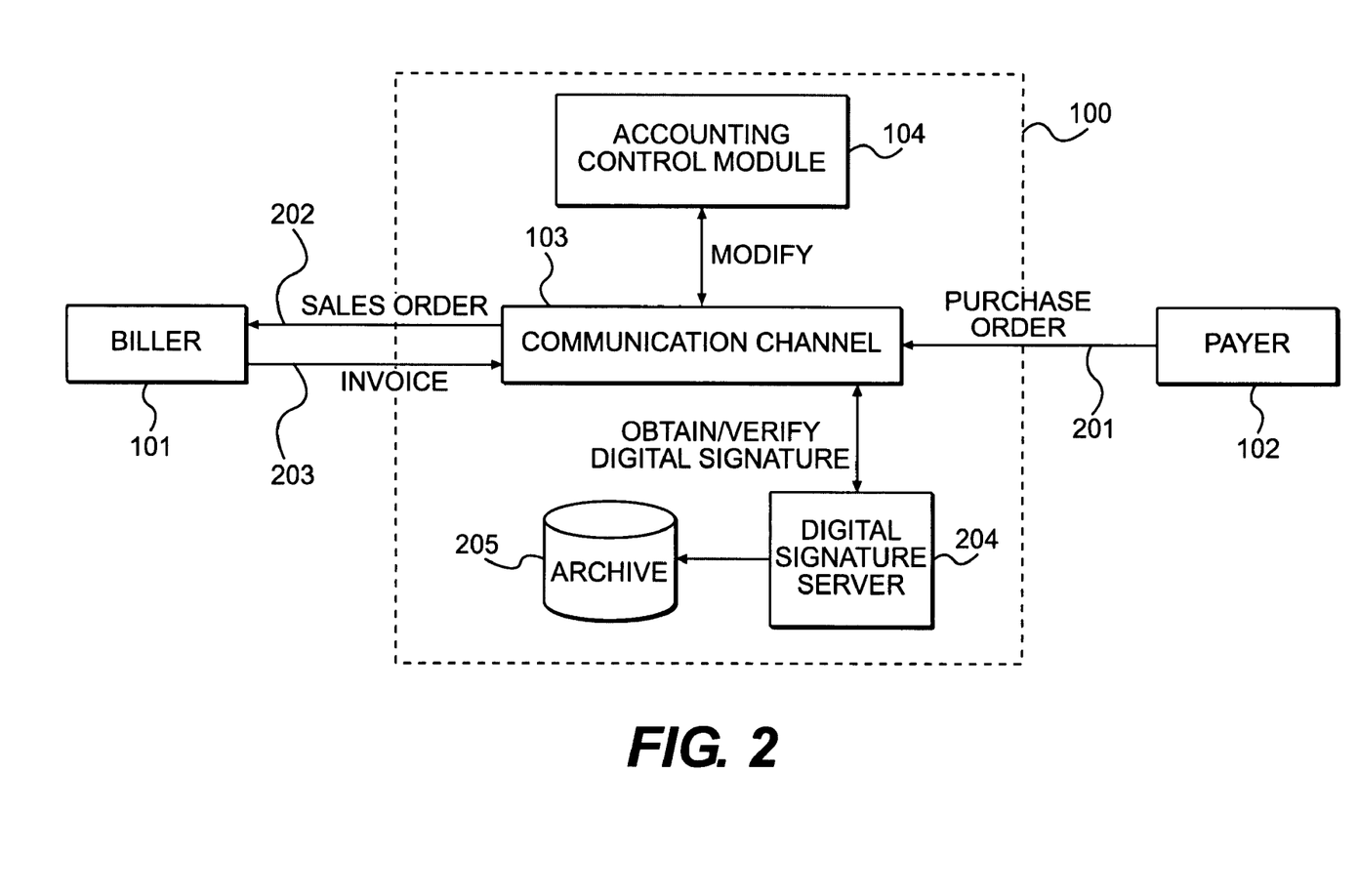
FIG. 2 illustrates an exemplary process for purchase order handling and invoicing, consistent with an embodiment of the present invention.

FIG. 2 illustrates an exemplary process for purchase order handling and invoicing in a shared financial service center 100, consistent with an embodiment of the invention. The transaction begins when Payer 102 sends a purchase order communication 201 to Biller 101. Purchase order communication 201 is sent via communication channel 103. Along the way, it is sent to the accounting control module 104 for processing. In this example, accounting control module 104 identifies purchase order communication 201 as relating to a purchase order and adds status information to the communication, such as "purchase order sent by Payer 102, but not yet received by Biller 101." Accounting control module 104 may also verify that the sending of a purchase order at that time does not violate any business rules. If it does not, then the modified message is formatted according to Biller 101's specifications and is sent as sales order 202 from accounting control module 104 to Biller 101. This formatting may include changing or enhancing accounting-relevant posting data that are required from Payer 102 to post the incoming sales order properly to Biller 101's system without manual intervention. For example, posting data may include cost and profit center information.

After the ordered product has been shipped to Payer 102, Biller 101 initiates an invoice communication 203 via communication channel 103. Like purchase order communication 201, invoice communication 203 passes through accounting control module 104 where it is processed. Among other things, accounting control module 104 may update the status information to reflect that a purchase order has been sent by Payer 102 to Biller 101, that Biller 101 has received the order, and that Biller 101 has sent an invoice related to that order. Those skilled in the art will recognize that various other modifications may also be made to the invoice before it is sent to Payer 102.

In accordance with one embodiment, after processing by accounting control module 104, the invoice communication may be sent to a digital signature server 204 via communication channel 103. Many companies require that invoices be digitally signed, and digital signature server 204 may perform that function by adding and verifying digital signatures. Server 204 may also store a copy of the digitally signed invoice in archive 205.

From digital signature server 204, the signed invoice communication may pass through accounting control module 104 so that its status can be updated and it can be formatted for delivery to Payer 102. This formatting may include transforming the outbound invoice into an invoice computer format that can be processed automatically by Payer 102. For example, the invoice may initially be in an SAP proprietary Intermediate Document (IDoc) format that is then converted into an Electronic Data Interchange (EDI) format. The invoice is then delivered via communication channel 103 to Payer 102. At this point, Payer 102 can pay the invoice in a manner that is tracked by accounting control module 104 in a manner described below.

As can be seen from this example, accounting control module 104 plays a recurring role in the financial transaction, and allows financial transaction information to pass seamlessly from one entity to another. It also keeps track of the status of the transaction, and coordinates the processing of the information. In short, accounting control module 104 allows financial transactions to achieve a level of automation and traceability that has previously been unknown.

Figure 3:
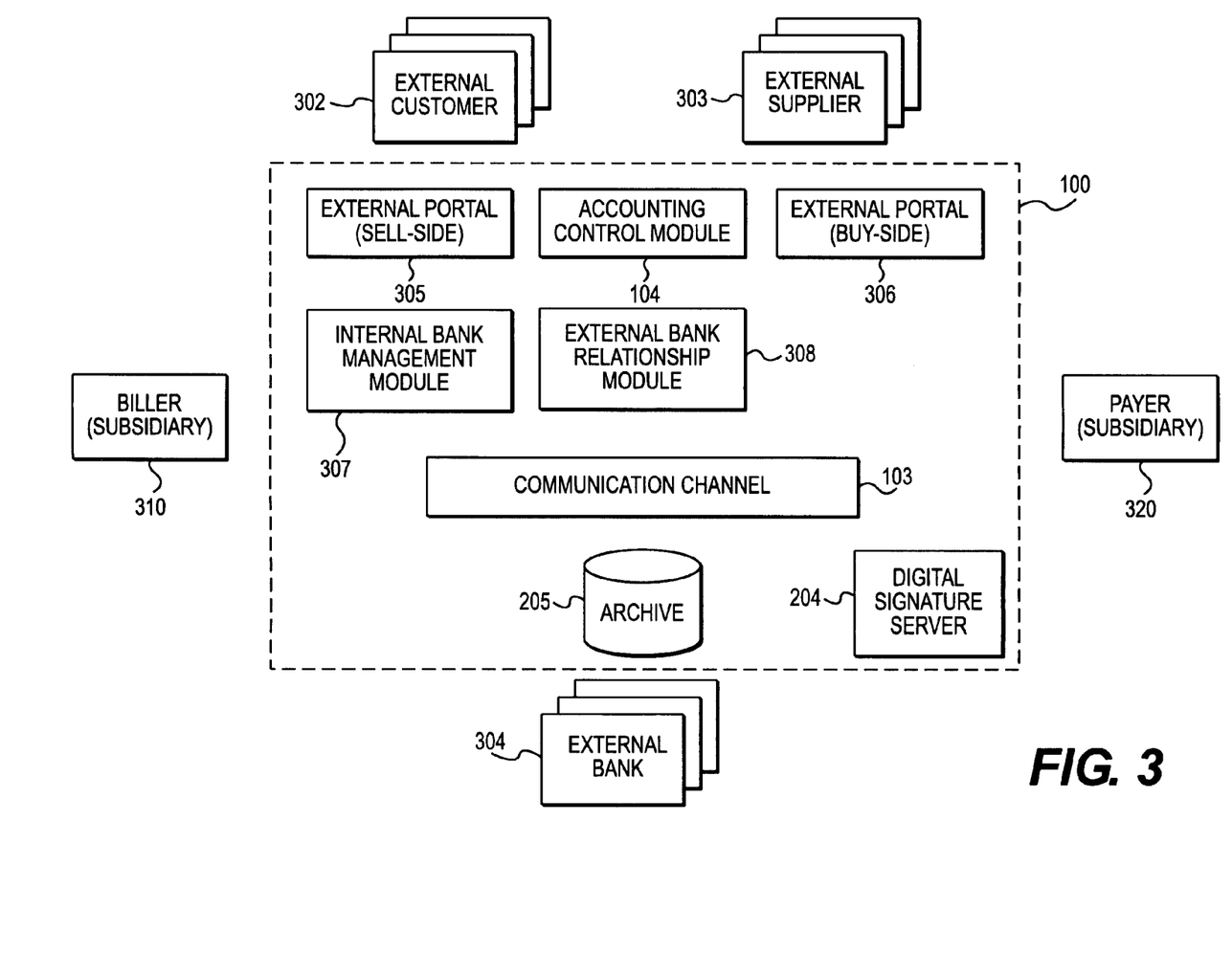
FIG. 3 is a block diagram of another exemplary shared financial service system, according to an embodiment of the present invention.

FIG. 3 is a block diagram of another exemplary shared financial service system 100, consistent with an embodiment of the present invention. Among other things, FIG. 3 illustrates various players and functional modules that may interact to achieve certain financial functions. They are shown without connecting lines, as their logical or physical connections may differ depending on the function(s) performed. The examples that follow will demonstrate their interaction under various scenarios. With this background, a more detailed description of FIG. 3 will be provided.

External customer 302 and external supplier 303 may be independent corporate entities (i.e., they are not subsidiaries of the same company or bear some other corporate relationship with one another). Further, in contrast to Biller 101 and Payer 102, which could have been but were not required to be subsidiaries (see FIGS. 1 and 2), Biller 310 and Payer 320 are shown in this example as being subsidiaries of the same company. Consequently, in processing many financial transactions they can be treated as being within the same corporate entity. Additionally, external bank 304 is a bank that may be used to assist in transferring funds between external entities.

Moving inside area 100, which represents a collection of modules consistent with a shared financial service system of the present invention, external portals 305 and 306 provide an interface for external entities, such as external customer 302 and external supplier 303, to access the modules in shared financial service system 100. They can be implemented, for example, through an Internet-based interface or any other electronic interface. In one exemplary embodiment consistent with the present invention, the Internet may be used in to transmit information to a Java-based application that may be connected to the accounting systems of Payer 320 or Biller 310. The Java-based application may be accessed via a standard web browser, and may render and display information from the accounting systems of Payer 320 and/or Biller 310.

In one embodiment, external portal 305 represents the portal for the selling side of the transaction, while external portal 306 represents the portal for the buying side of the transaction. External portal 305 may be capable of displaying account and invoice data, and may provide tools for downloading and disputing invoices. Similarly, external portal 306 may be capable of displaying account and invoice data, and may permit invoices to be uploaded. Those skilled in the art will appreciate that, while these modules are represented as being distinct in FIG. 3, they can in fact be combined into a single portal module.

Internal bank management module 307 may facilitate intra-company transactions, such as those between subsidiaries. It may also be used in coordination with external bank relationship module 308 to facilitate transactions between an internal entity, such as a subsidiary, and an external entity where external bank 304 may be necessary to complete the transaction. Internal bank module 307 may also create internal bank statements that it sends to internal entities. In one embodiment, external bank relationship module 308 may provide several functions, including batching external payments, monitoring the status of external payments, and providing an approval process for outgoing payments.

Having introduced examples of the potential parties to a transaction and the modules that may be used to facilitate that transaction in the exemplary system of FIG. 3, several examples will now be provided to illustrate how the modules may be utilized in various transactions.

Figure 4:
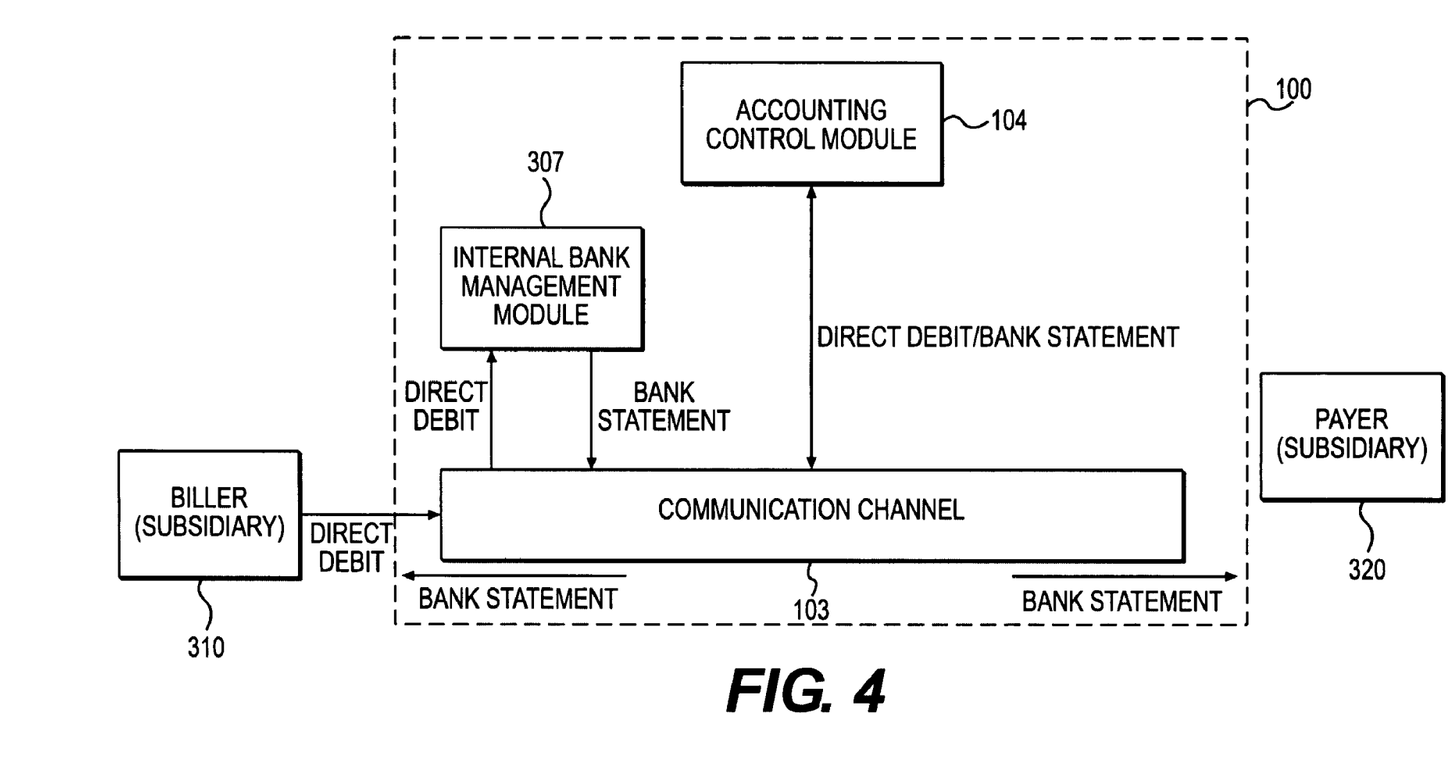
FIG. 4 illustrates an exemplary process for performing a direct debit transaction, consistent with an embodiment of the present invention.

FIG. 4 illustrates an exemplary process for performing a direct debit transaction using a shared financial service system 100, consistent with an embodiment of the present invention. In the example of FIG. 4, a debit transaction is performed between Biller 310 and Payer 320, both of which are subsidiaries of the same company. Since this is effectively an internal transaction, there is no need to involve an external bank, although one could be used if desired. This example picks-up where FIG. 2 left off. That is, a purchase order was sent from Payer 320 to Biller 310, and Biller 310 provided the requested goods and sent an invoice to Payer 320. Now, Payer 320 must pay the invoice. To accomplish this payment, internal bank management module 307, accounting control module 104, and communication channel 103 may be used to complete a debit transaction.

Since all players in the transaction are internal, Biller 310 has previously been given the authority to directly debit Payer 320. This authority can be granted based on previous transactions or trust between the internal organizations, or can be based on one or more business rules. For example, there may be a business rule held in accounting control module 104 that allows a party to directly debit another party when the party to be debited has not disputed an invoice after a predetermined number of days (e.g., 3 days). In that instance, it is assumed that the invoice has been accepted and that a direct debit is acceptable. Regardless of where the authority is derived, this example assumes that Biller 310 has the authority to directly debit Payer 320 to pay the invoice.

Biller 310 initiates a direct debit transaction and sends a direct debit communication via communication channel 103. Communication channel 103 sends the debit request to accounting control module 104, which validates the direct debit and tracks it. It may also modify the direct debit communication to include, for example, status information or other useful information. Accounting control module 104 then passes the potentially-modified direct debit communication back to the communication channel 103, which delivers the direct debit communication to internal bank management module 307. Internal bank management module 307 then prepares an internal bank statement that is sent via communication channel 103 to Biller 310, Payer 320, and accounting control module 104, which updates the status of the transaction to note that the debit occurred and statements were sent. The direct debit transaction has now been completed with a high level of automation, and has been traceable at each step of the transaction.

Figure 5:
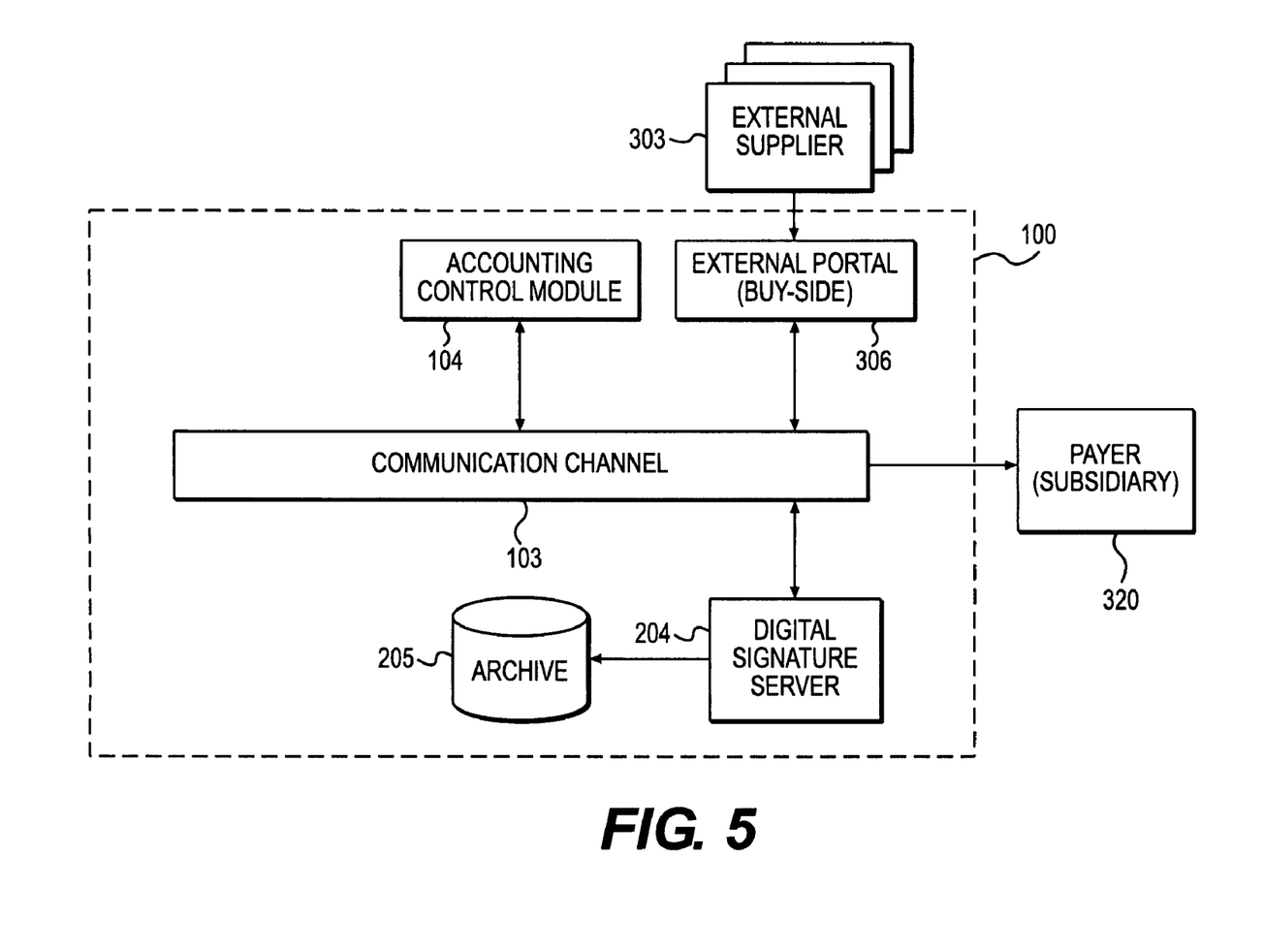
FIG. 5 illustrates an exemplary process for performing an invoicing transaction with an external supplier, consistent with an embodiment of the present invention.

FIG. 5 illustrates an exemplary process for performing an invoicing transaction with an external supplier, consistent with an embodiment of the present invention. More specifically, FIG. 5 illustrates how the modules interact when, for example, external supplier 303 invoices Payer 320. First, external supplier 303 creates an invoice and uploads it into external portal 306, which imports it. A communication regarding the creation of the invoice is sent via communication channel 103 to accounting control module 104, which tracks the invoice and orchestrates the verification of the invoice. Accounting control module 104 may send the invoice communication via communication channel 103 to, for example, digital signature server 204 for verification of the digital signature. Digital signature server 204 stores the invoice and the digital signature in archive 205. After verifying the digital signature, digital signature server 204 then sends the invoice communication to accounting control module 104 to update its status information. Accounting control module 104 then sends the invoice communication to Payer 320, who verifies that the invoice reflects the agreed payment terms.

Figure 6:
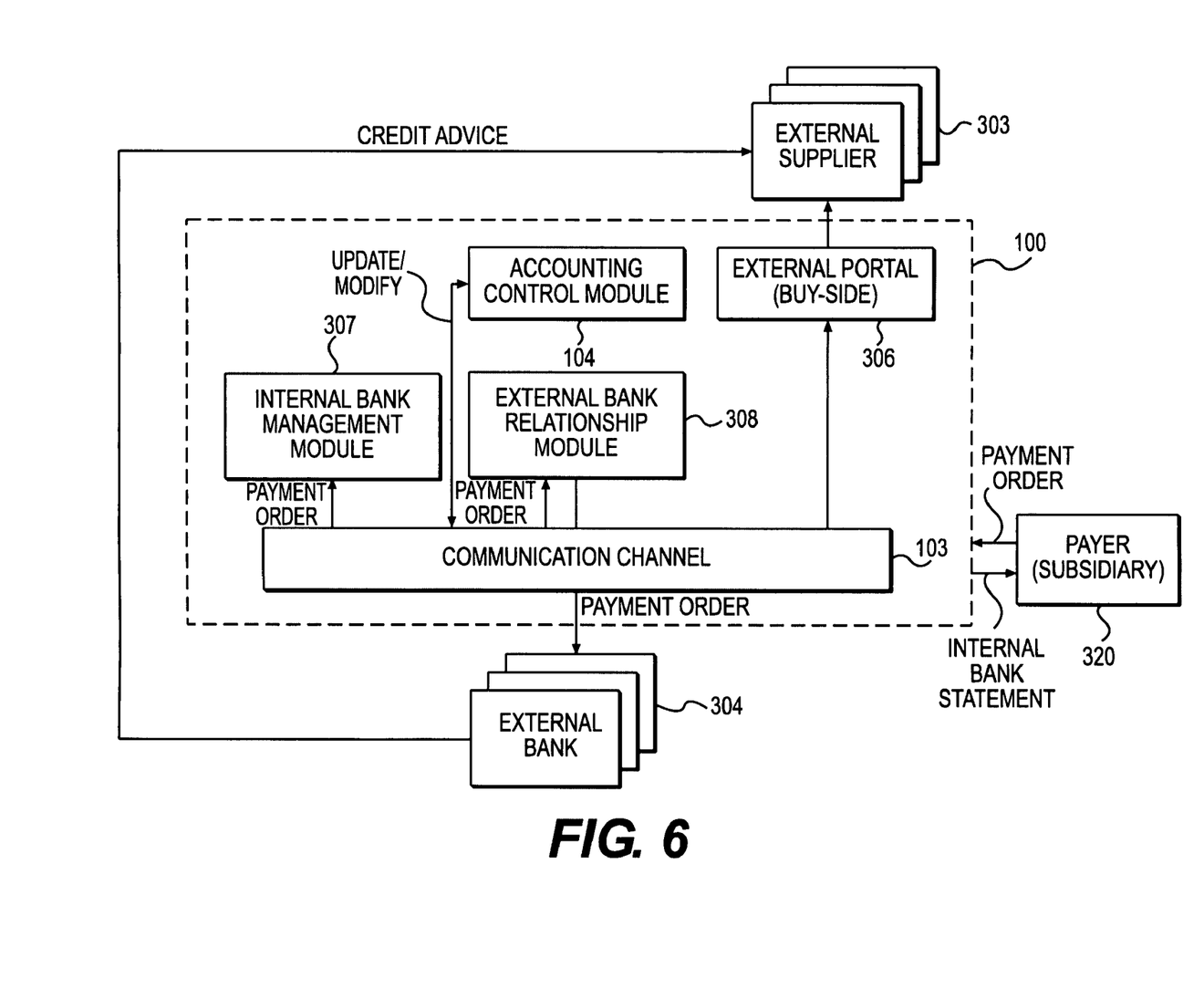
FIG. 6 illustrates an exemplary process for performing a payment transaction involving an external supplier and an external bank, consistent with an embodiment of the present invention.

FIG. 6 illustrates an exemplary process for performing a payment transaction involving an external supplier and an external bank, consistent with an embodiment of the present invention. More specifically, FIG. 6 illustrates what may occur once the invoice is verified and Payer 320, for example, decides to pay it. As shown in FIG. 6, Payer 320 creates a payment order that is transferred via communication channel 103 to accounting control module 104. Accounting control module 104 adds status information to the communication, perhaps along with other information, and sends the payment order communication to internal bank management module 307 and external bank relationship module 308 via communication channel 103. External bank relationship module 308 processes the payment order communication and sends a communication to external bank 304 who then credits external supplier 303's account. External bank 304 advises external supplier 303 that a credit has been applied to its account.

At some point, and perhaps simultaneously with the operation of external bank relationship module 308, internal bank management module 307 may prepare an internal bank statement that it sends to Payer 320 via communication channel 103. However, as in the prior examples, before the statement communication reaches Payer 320 it passes through accounting control module 104 so that the message can be processed, including for adding status information and so the accounting control module 104 can update its tracking information for the transaction. This status information can be reflected in external portal 306. In such a case, external supplier 303 may use external portal 306 to view the status of the invoice payment in addition to receiving the credit advice directly from external bank 304.

As illustrated in the above examples, every time a module sends, receives, modifies, or otherwise handles a communication, accounting control module 104 is notified and processes the communication. Processing may include, for example, updating information in the communication or applying one or more business rules to it. Consistent with the disclosed embodiments, accounting control module 104 effectively orchestrates and tracks transactions through the financial supply chain. It does so with a minimum of user intervention, and helps to handle and minimize differences between various players in a financial or accounting transaction.

Consistent with one embodiment, accounting control module 104 may be implemented in software through a composite application that includes a persistence layer and a remote connectivity component to allow communication with one or more other modules or systems. The exemplary software application may reside within a company's information technology infrastructure, or it may be hosted external to the company. The exemplary software application may be written using SAP AG's Advanced Business Application Programming (ABAP) language to build various functional components in the persistence layer, such as a status manager, an exception handler, and a business rule handler. The exemplary software application may also utilize SAP AG's Service Oriented Architecture (SOA) to define web services that allow it to communicate with other applications, such as other ERP applications (e.g., those offered by Oracle). In this example, the software may run in SAP AG's NetWeaver (SAP Web Application Server ABAP-stack) environment, and may also utilize SAP AG's mySAP ERP 2005 Enhancement Package 3 (Enterprise Core Component 6.0).

Figure 7:
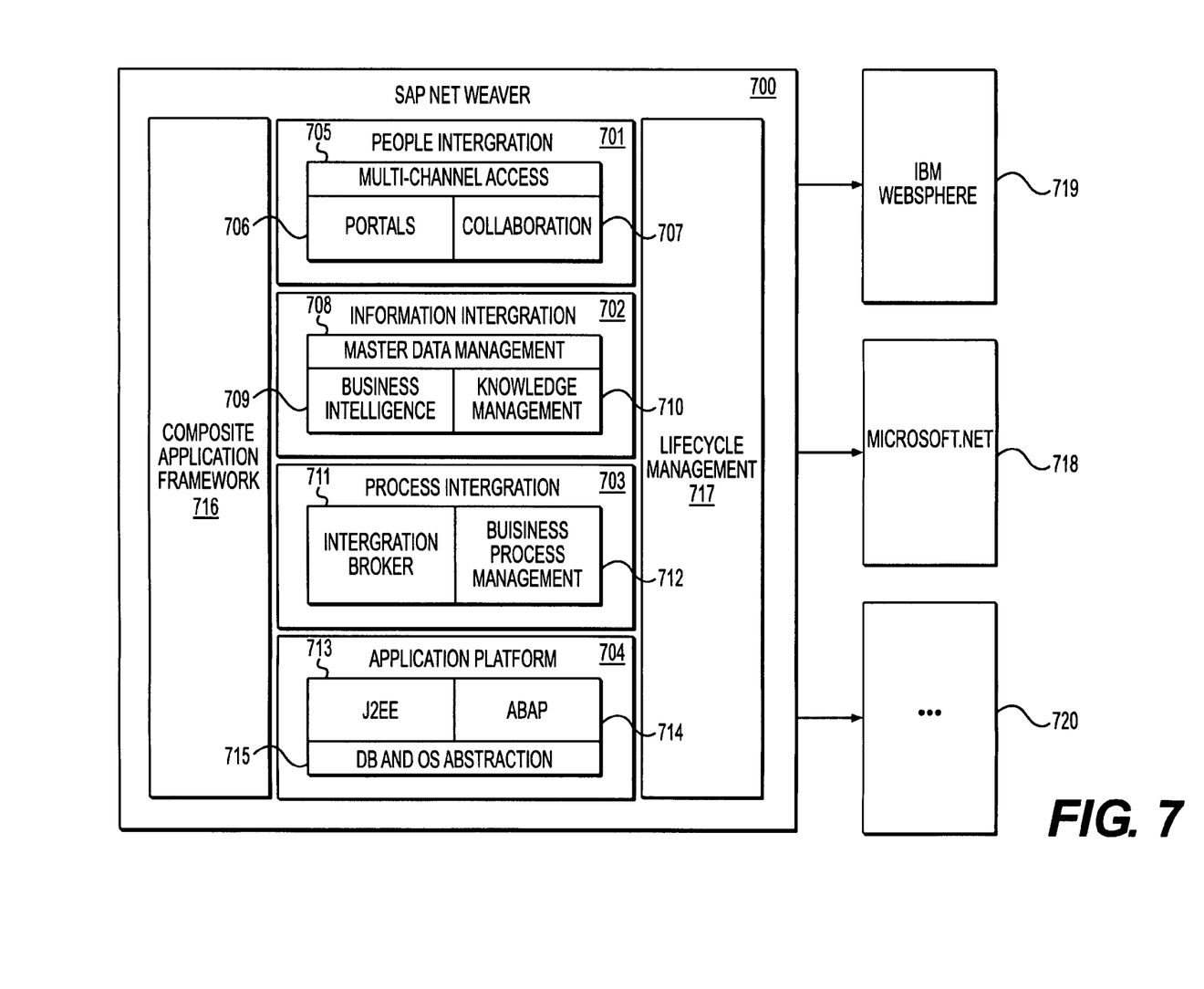
FIG. 7 illustrates an exemplary embodiment of SAP AG's NetWeaver environment.

FIG. 7 illustrates an embodiment of SAP AG's NetWeaver environment 700. NetWeaver environment 700 comprises various SAP platforms that are merged together to provide the integration of people, information, and processes in one solution. The environment 700 includes people integration 701, information integration 702, process integration 703, and an application platform 704.

People integration 701 is performed using a portal solution 706 and a platform to work in collaboration 707. Users are provided a multi-channel access 705 to ensure mobility. Examples of the portal solution 706 include SAP Enterprise Portal, SAP Mobile Engine, and Collaboration Package for SAP Enterprise Portal. Information integration 702 refers to the conversion of information into knowledge. Information integration 702 provides efficient business intelligence 709 and knowledge management 710 using, for example, SAP products such as Business Information Warehouse (BW) and Knowledge Management (KM). Further, consolidation of master data management beyond system boundaries may be performed using SAP's Master Data Management 708. Process integration 703 refers to optimized process management using an integration broker or SAP exchange infrastructure 711 and business process management techniques 712. Examples of products to perform process integration 703 include SAP's Exchange Infrastructure and Business Process Management.

An application platform 704 may include SAP's Web Application Server (Web AS), which may for the basis for SAP applications. Web AS, which may be independent of the database and operating system 715, includes a J2EE engine 713 in combination with the proprietary ABAP engine 714 to further enhance the application platform 704. In one embodiment, the application platform 704 includes operation of a web service to provide an interface for heterogeneous external clients to manage systems provided by the application platform 704.

The environment 700 further includes a composite application framework 716 to provide various open interfaces (APIs) and a lifecycle management component 717, which is an extension of a transport management system. As illustrated, the environment 700 further provides communication with the Microsoft.NET framework 718, International Business Machine (IBM) WebSphere 719, and other such systems 720.

The foregoing description of possible implementations consistent with the present invention does not represent a comprehensive list of all such implementations or all variations of the implementations described. For example, the disclosed modules may interact with other financial services modules to assist in virtually any financial or accounting transaction, such as reconciling transactions between parties. Furthermore, the modules can be contained in or integrated with such enterprise resource planning packages as those offered by SAP AG and others.

The description herein of only some implementations should not be construed as an intent to exclude other implementations. Artisans will understand how to implement embodiments of the invention in many other ways, using equivalents and alternatives that do not depart from the scope of the following claims. Moreover, unless indicated to the contrary in the preceding description, none of the components described in the disclosed implementations is essential to the invention.

What is claimed is:

1. A computer-implemented method for sharing financial services comprising:

receiving a communication, at an accounting control module through a communication channel, from a first party to a financial or accounting transaction, wherein the communication is associated with accounting-relevant posting data;

determining whether the transaction violates a business rule associated with a second party and, if not, using the accounting control module to change or enhance the accounting-relevant posting data with cost and profit-center information, as required to post, without manual intervention, the transaction to a system associated with the second party;

tracking a status of the transaction using the accounting control module;

sending the modified information to the second party through the communication channel;

the second party initiating a response to the modified information and sending the response through the communication channel to the accounting control module;

modifying the response using the accounting control module;

tracking a response status of the transaction using the accounting control module;

reporting, without manual intervention, the response status of the transaction to at least one of the parties using the accounting control module according to at least one pre-configured reporting rule; and sending the modified response through the communication channel to the first party.

2. The method of claim 1 wherein the accounting control module modifies the information to add status information.

3. The method of claim 1 wherein the modification of the information comprises converting the information from one data format to another data format.

4. The method of claim 1 wherein the status of the transaction is reported in a file format selected from the group consisting of HTML, XML, and PDF.

5. The method of claim 1 wherein the accounting control module initiates the processing of the information or the modified information by at least one other functional module.

6. The method of claim 5 wherein the at least one other functional module is selected from the group consisting of an external portal, an internal bank management module, an external bank relationship module, and a digital signature server.

7. The method of claim 1 wherein the accounting control module enforces at least one predetermined rule.

8. The method of claim 7 wherein the enforcement comprises notifying at least one party that the transaction violates at least one predetermined rule.

9. A shared financial service system comprising:
a communication channel for sending a communication between a first party and a second party;
an accounting control module for receiving the communication from at least one party to a financial or accounting transaction, wherein the communication is associated with accounting-relevant posting data, wherein the accounting control module is configured to determine whether the transaction violates a business rule associated with the second party and, if not, to change or enhance the accounting-relevant posting data with cost and profit-center information, as required to post, without manual intervention, the transaction to a system associated with the second party to modify before sending the communication through the communication channel to another party, the accounting control module is configured to report, without manual intervention, the response status of the transaction to at least one of the parties according to at least one pre-configured reporting rule, and the accounting control module is configured to track the status of the transaction; and
a digital signature server for receiving the communication from the accounting control module over the communication channel, wherein the digital signature server is configured to add and verify a digital signature to the communication.

10. The system of claim 9 wherein the accounting control module is configured to modify the communication to add status information.

11. The system of claim 9 wherein the modification of the communication comprises converting the communication from one data format to another data format.

12. The system of claim 9 wherein the status of the transaction is reported in a file format selected from the group consisting of HTML, XML, and PDF.

13. The system of claim 9 wherein the accounting control module is configured to initiate the processing of the communication or the modified communication by at least one other functional module.

14. The system of claim 13 wherein the at least one other functional module is selected from the group consisting of an external portal, an internal bank management module, an external bank relationship module, and a digital signature server.

15. The system of claim 9 wherein the accounting control module is configured to enforce at least one predetermined rule.

16. The system of claim 15 wherein the enforcement comprises notifying at least one party that the transaction violates at least one predetermined rule.

17. A shared financial service system comprising:
a communication means for sending a communication between a first party and a second party;
an accounting control means for (a) receiving the communication from at least one party to a financial or accounting transaction, wherein the communication is associated with accounting-relevant posting data;(b) determining whether the transaction violates a business rule associated with the second party and, if not, changing or enhancing the accounting-relevant posting data with cost and profit-center information, as required to post, without manual intervention, the transaction to a system associated with the second party; (c) reporting, without manual intervention, the response status of the transaction to at least one of the parties according to at least one pre-configured reporting rule, and (d) tracking the status of the application; and
a digital signature server for receiving the communication from the accounting control application using the communication application, wherein the digital signature server is configured to add and verify a digital signature to the communications.

18. A shared financial service system comprising:
a computer system configured to execute software, wherein the software comprises (a) a communication application configured to send a communication from at least one party to a financial or accounting transaction, wherein the communication is associated with accounting-relevant posting data, and (b) an accounting control application configured to determine whether the transaction violates a business rule associated with the second party and, if not, to change or enhance the accounting-relevant posting data with cost and profit-center information, as required to post, without manual intervention, the transaction to a system associated with the second party before sending the communication to another party by utilizing the communication application, the control application is configured to report, without manual intervention, the status of the transaction to at least one of the parties according to at least one pre-configured reporting rule; and the accounting control application is configured to track the status of the transaction.

19. The system of claim 18 wherein the accounting control application is configured to modify the communication to add status information.

20. The system of claim 18 wherein the modification of the communication comprises converting the communication from one data format to another data format.

21. The system of claim 18 wherein the status of the transaction is reported in a file format selected from the group consisting of HTML, XML, and PDF.

22. The system of claim 18 wherein the accounting control application is configured to initiate and process the communication or the modified communication by at least one other software application.

23. The system of claim 22 wherein the at least one other software application is selected from the group consisting of an external portal application, an internal bank management application, an external bank relationship application, and a digital signature application.

24. The system of claim 18 wherein the accounting control application is configured to enforce at least one predetermined rule.

25. The system of claim 24 wherein the enforcement comprises notifying at least one party that the transaction violates at least one predetermined rule.

* * * * *